United States Patent
Reeves et al.

(10) Patent No.: US 9,820,216 B1
(45) Date of Patent: Nov. 14, 2017

(54) WIRELESS TRAFFIC CHANNEL RELEASE PREVENTION BEFORE UPDATE PROCESS COMPLETION

(71) Applicant: Sprint Communications Company L.P., Overland Park, KS (US)

(72) Inventors: Raymond Emilio Reeves, Oviedo, FL (US); Gary Duane Koller, Overland Park, KS (US); Deveshkumar Narendrapratap Rai, Overland Park, KS (US)

(73) Assignee: Sprint Communications Company L.P., Overland, KS (US)

( * ) Notice: Subject to any disclaimer, the term of this patent is extended or adjusted under 35 U.S.C. 154(b) by 26 days.

(21) Appl. No.: 14/275,054

(22) Filed: May 12, 2014

(51) Int. Cl.
| | | |
|---|---|---|
| *H04M 1/66* | (2006.01) | |
| *H04M 1/68* | (2006.01) | |
| *H04M 3/16* | (2006.01) | |
| *H04W 72/00* | (2009.01) | |
| *H04W 48/08* | (2009.01) | |
| *H04W 76/06* | (2009.01) | |
| *H04W 72/02* | (2009.01) | |
| *H04W 76/02* | (2009.01) | |
| *H04W 12/06* | (2009.01) | |

(52) U.S. Cl.
CPC .......... *H04W 48/08* (2013.01); *H04W 12/06* (2013.01); *H04W 72/02* (2013.01); *H04W 76/02* (2013.01); *H04W 76/06* (2013.01)

(58) Field of Classification Search
CPC ..... H04W 12/06; H04W 48/08; H04W 72/02; H04W 76/02; H04W 76/06
USPC ...................... 455/410, 411, 414.1
See application file for complete search history.

(56) References Cited

U.S. PATENT DOCUMENTS

| | | | |
|---|---|---|---|
| 5,710,805 A * | 1/1998 | Armbruster ........ | H04B 7/18545 455/433 |
| 6,173,174 B1 | 1/2001 | Jacobs | |
| 6,195,546 B1 | 2/2001 | Leung et al. | |
| 6,226,511 B1 * | 5/2001 | Jacobs .................. | H04W 12/06 455/411 |
| 6,243,811 B1 | 6/2001 | Patel | |
| 6,507,567 B1 * | 1/2003 | Willars ................. | H04W 76/04 370/321 |
| 6,625,443 B1 * | 9/2003 | Kamperschroer | H04M 1/72505 455/414.1 |
| 6,728,529 B2 | 4/2004 | Kuo et al. | |

(Continued)

FOREIGN PATENT DOCUMENTS

WO      9831162      7/1998

*Primary Examiner* — Rafael Pérez-Gutiérrez
*Assistant Examiner* — Mark G. Pannell

(57) ABSTRACT

Embodiments described herein provide systems and methods for preventing release of a wireless traffic channel before update process completion. In a particular embodiment, a method provides establishing a wireless traffic channel between the wireless communication device and a wireless access point of a wireless communication network. The method further provides identifying an event that triggers release of the wireless traffic channel by the wireless communication device and, upon identifying the event, preventing the release of the wireless traffic channel until a background update process that uses the wireless traffic channel is completed. Upon completion of the background update process, the method provides allowing the release of the wireless traffic channel.

16 Claims, 7 Drawing Sheets

(56) References Cited

U.S. PATENT DOCUMENTS

| | | | |
|---|---|---|---|
| 6,965,778 B1 | 11/2005 | Ferguson et al. | |
| 6,968,191 B2 | 11/2005 | Lindner et al. | |
| 7,418,601 B2* | 8/2008 | Okamoto | H04N 5/23206 |
| | | | 348/207.1 |
| 7,630,345 B2 | 12/2009 | Liu | |
| 8,532,599 B2 | 9/2013 | DiGirolamo et al. | |
| 2003/0214928 A1* | 11/2003 | Chuah | H04L 12/2602 |
| | | | 370/336 |
| 2004/0235487 A1* | 11/2004 | Sprigg | H04W 76/02 |
| | | | 455/452.1 |
| 2005/0119008 A1* | 6/2005 | Haumont | H04W 4/005 |
| | | | 455/456.1 |
| 2005/0213530 A1* | 9/2005 | Kuure | H04W 76/04 |
| | | | 370/328 |
| 2007/0005795 A1* | 1/2007 | Gonzalez | G06F 17/30017 |
| | | | 709/232 |
| 2012/0202502 A1* | 8/2012 | Wu | H04W 8/12 |
| | | | 455/436 |
| 2012/0315882 A1* | 12/2012 | Chang | H04M 1/72522 |
| | | | 455/414.1 |
| 2013/0003697 A1* | 1/2013 | Adjakple | H04W 36/0011 |
| | | | 370/331 |
| 2014/0071806 A1* | 3/2014 | Singh | H04W 24/04 |
| | | | 370/216 |

* cited by examiner

WIRELESS TRAFFIC CHANNEL RELEASE PREVENTION BEFORE UPDATE PROCESS COMPLETION

TECHNICAL BACKGROUND

Wireless communication devices exchange communications with wireless network access nodes of a wireless communication network over wireless traffic channels. A single wireless traffic channel can be assigned to multiple wireless devices, though not at the same time. A device will release the traffic channel and the traffic channel can be used by another device. This arrangement allows for more efficient use of wireless signal spectrum among multiple wireless devices.

Typically, a wireless device exchanges authorization information with a wireless network before the wireless network allows the wireless device to exchange communications over a traffic channel. Occasionally, the wireless network requires that the wireless device's authorization information be updated. A process used to update the wireless information may use a traffic channel assigned to the wireless device using previous authorization information. If the traffic channel is released before the update process completes, then the wireless device may not be authorized to access the wireless network when requesting access in the future.

Overview

Embodiments described herein provide systems and methods for preventing release of a wireless traffic channel before update process completion. In a particular embodiment, a method provides establishing a wireless traffic channel between the wireless communication device and a wireless access point of a wireless communication network. The method further provides identifying an event that triggers release of the wireless traffic channel by the wireless communication device and, upon identifying the event, preventing the release of the wireless traffic channel until a background update process that uses the wireless traffic channel is completed. Upon completion of the background update process, the method provides allowing the release of the wireless traffic channel.

In another embodiment, a wireless communication device is provided. The wireless communication device includes a communication interface configured to establish a wireless traffic channel between the wireless communication device and a wireless access point of a wireless communication network. The wireless communication device further includes a processing system configured to identify an event that triggers release of the wireless traffic channel by the wireless communication device and, upon identifying the event, prevent the release of the wireless traffic channel until a background update process that uses the wireless traffic channel is completed. The processing system is further configured to, upon completion of the background update process, allow the release of the wireless traffic channel.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
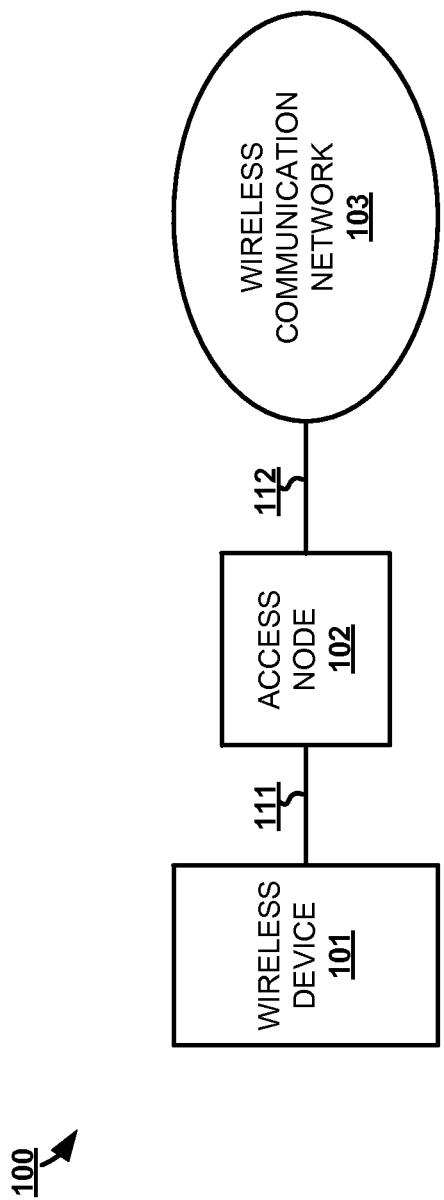
FIG. 1 illustrates a wireless communication system for preventing release of a wireless traffic channel before update process completion.

FIG. 1 illustrates wireless communication system 100. Wireless communication system 100 includes wireless communication device 101, wireless access node 102, and wireless communication network 103. Wireless communication device 101 and wireless access node 102 communicate over wireless link 111. Wireless access node 102 and wireless communication network 103 communicate over communication link 112.

In operation, wireless network 103 provides wireless communication services to wireless device 101 via wireless access node 102. These services may include voice, text, data, or some other type of service—including combinations thereof. To access wireless network 103 for many of these services, a wireless traffic channel is needed on wireless link 111 between wireless device 101 and access node 102. A traffic channel carries the bulk of communications traffic exchanged with a wireless device while a relatively low bandwidth control channel typically exchanges underlying control communications, including at least a portion of the communications necessary to establish a traffic channel.

In most cases, a communication exchange over the traffic channel causes the traffic channel to remain open until the communication exchange is complete. However, some processes that use the traffic channel may be processes that do not cause the traffic channel to remain open until completion. For example, a process to update authentication credentials for a wireless device in a wireless Code Division Multiple Access (CDMA) network may exchange communications over a traffic channel established to make a voice call. This update process may not be recognized as a process for which the traffic channel should remain open, such a non-recognized process is referred to herein as a background process. Therefore, if the voice call were to end before the update process completes, the traffic channel may be released and cause the failure of the update process.

Figure 2:
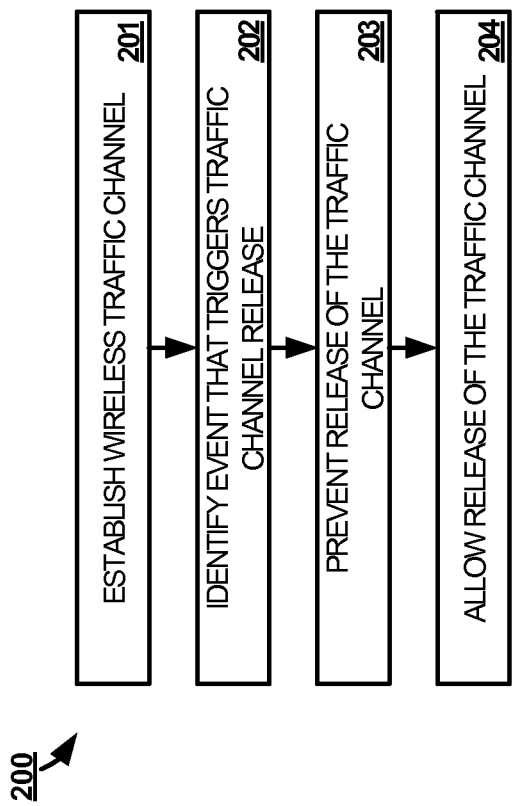
FIG. 2 illustrates an operation of the wireless communication system to prevent release of a wireless traffic channel before update process completion.

FIG. 2 illustrates an operation 200 of wireless communication system 100 to prevent release of a wireless traffic channel before update process completion. Operation 200 provides establishing a wireless traffic channel between wireless communication device 101 and wireless access point 102 of wireless communication network 103 (step 201). Operation 200 further provides identifying an event that triggers release of the wireless traffic channel by wireless communication device 101 (step 202) and, upon identifying the event, preventing the release of the wireless traffic channel until a background update process that uses the wireless traffic channel is completed (step 203). Upon completion of the background update process, operation 200 provides allowing the release of the wireless traffic channel (step 204).

Accordingly, even though an event, such as the end of a voice call or completion of a data exchange, may typically trigger the release of the wireless traffic channel despite the background update process, operation 200 prevents the traffic channel from being released until after the background update process has been completed.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, tablet, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. While shown externally to wireless communication network 103, wireless access node 102 is considered part of wireless communication network 103. Wireless access node 102 could be a base station, eNodeB, Internet access node, telephony service node, wireless data access point, or some other wireless communication system—including combinations thereof.

Wireless communication network 103 comprises network elements that provide communications services to wireless device 101 through wireless access node 102. Wireless communication network 103 may comprise switches, other wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
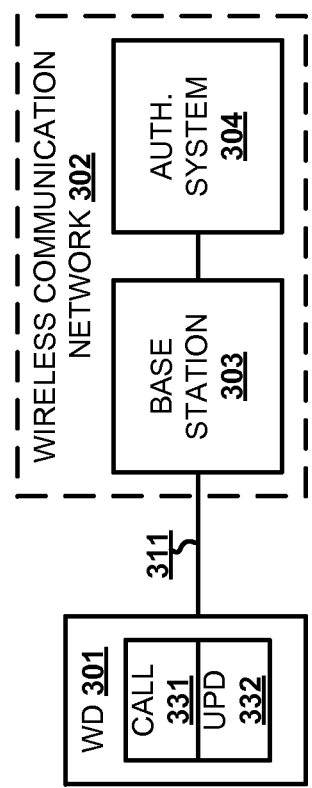
FIG. 3 illustrates a wireless communication system for preventing release of a wireless traffic channel before update process completion.

FIG. 3 illustrates wireless communication system 300. Wireless communication system 300 includes wireless communication device 301 and wireless communication network 302. Wireless communication network 302 includes base station 303 and authorization system 304. Wireless communication device 301 and wireless communication network 302 communicate over wireless link 311.

Authorization system 304 comprises a computer system and a communication interface. Authorization system 304 authorizes/authenticates wireless devices for access to wireless network 302. In some examples, the functionality of authorization system 304 may be incorporated into base station 303. Authorization system 304 may be an authentication center (AC), which may be incorporated into a home location register (HLR) as an HLR/AC.

Figure 4:
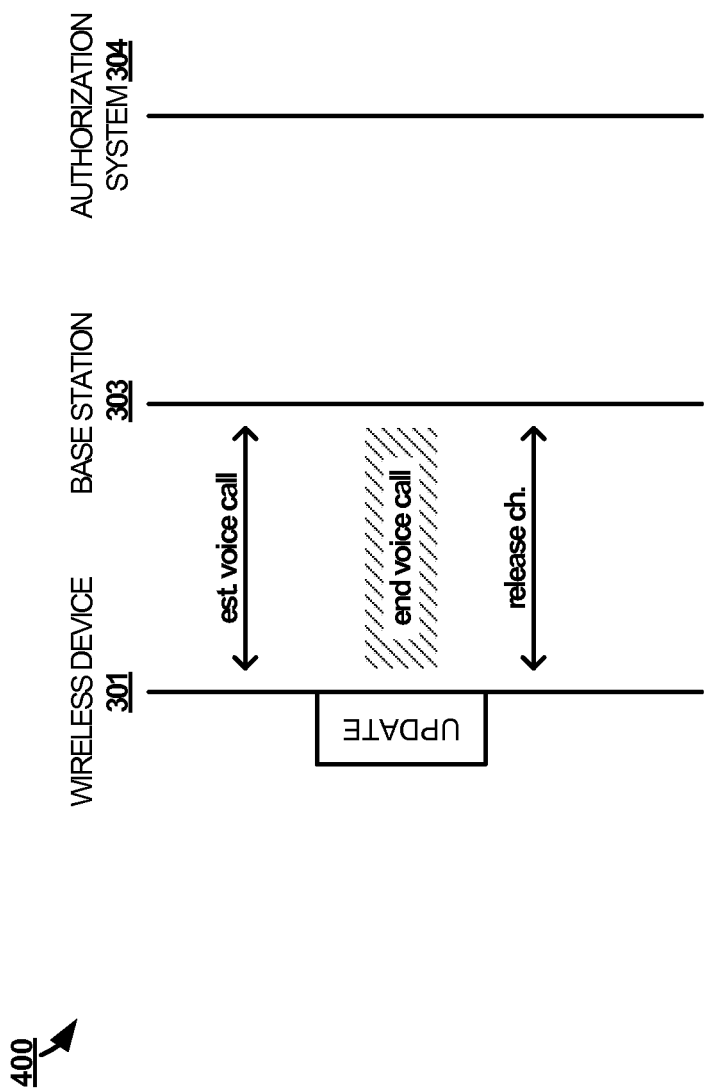
FIG. 4 illustrates an operation of the wireless communication system to prevent release of a wireless traffic channel before update process completion.

FIG. 4 illustrates an operation 400 of wireless communication system 300 to prevent release of a wireless traffic channel before update process completion. In this example, call module 331 directs wireless device 301 to establish a voice call with another device over a wireless traffic channel with base station 302. The call may be initiated by wireless device 301 as an outgoing call or by the other device as an incoming call. While this example describes a voice call using the traffic channel, the traffic channel could be in use for other services, such as data exchanges for applications executing on wireless device 301.

After the wireless traffic channel is established for the voice call, background update process 332 begins that uses the wireless traffic channel to exchange communications for the update while the wireless traffic channel established. Update process 332 may update information on wireless device 301. The information may include authentication information used by wireless device 301 when requesting access to wireless network 302, without which wireless device 301 is not allowed to access wireless network 302. Additionally, the information may include other network access information, such as a preferred roaming list, device settings, software, or any other type of information that may be transferred over a wireless network—including combinations thereof. Depending on the information updated by update process 332, update process 332 may exchange communications with authorization system 304 via the wireless traffic channel, with other systems in wireless network 302, or with other systems accessible via wireless network 302, such as the Internet.

At some point during the execution of background update process 332, the voice call is ended. The voice call may be ended by wireless device 301 or the other device receiving a user instruction to end the call, by a system on the call path between the two devices ending the call, or for some other reason a call may be ended. Once the call is ended, the wireless traffic channel used to carry the call would be released if background update process 332 was not occurring. However, since the background update process is still occurring in this example, wireless device 301 is prevented from releasing the wireless traffic channel until update process 332 completes. In wireless traffic channel examples other than a voice call, an event that would normally allow the release of the wireless traffic channel may be completion of an email fetch or transfer, the completion of a website receipt, the completion of a data exchange for an application executing on wireless device 301, or some other reason that a traffic channel would no longer be needed—including combinations thereof.

In this example, upon the voice call ending, wireless device 301 notifies its user that the call has ended. For instance, a display screen of wireless device 301 may indicate that the call has ended in a display view of a phone call application. Thus, as far as the user is concerned, the wireless traffic channel for the voice call has been released. However, since background update process 332 is still executing, the wireless traffic channel is still active despite the notification to the user that it has been released.

Upon completion of background update process 332, wireless device 301 is allowed to release the wireless traffic channel because update process 332 no longer needs the wireless traffic channel. As shown in operation 400, the wireless traffic channel is released after the completion of update process 332. However, in some situations, wireless device 301 may execute another operation, such as another phone call, at or before the completion of the update process 332. In those situations, while wireless device 301 is allowed to release the wireless traffic channel upon completion of update process 332, wireless device 301 does not release the wireless traffic channel due to the new operation's need of the wireless traffic channel.

To identify the completion of update process 332, wireless device 301 may recognize when instructions for update process 332 are no longer executing or there may exist some other trigger either within the instructions or elsewhere in wireless device 301 that indicates to wireless device 301 when update process 332 is completed. In some examples, authorization system 304 notifies wireless device 301 of update process 332's completion. In other examples, wireless device 301 maintains a predetermined period of time within which update process 332 should be able to complete (e.g. ten seconds). Upon the time period elapsing since update process 332 began, wireless device 301 is allowed to release the wireless traffic channel.

Figure 5:
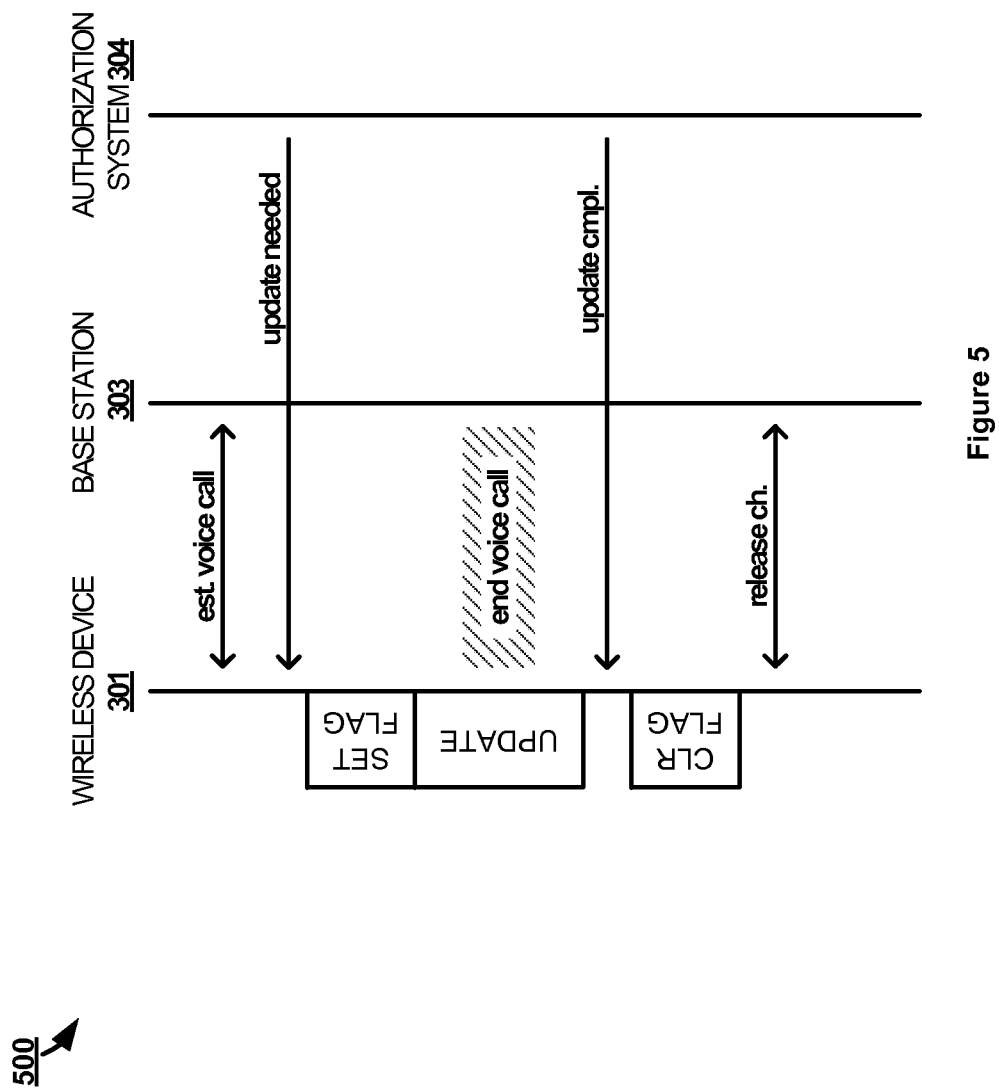
FIG. 5 illustrates an operation of the wireless communication system to prevent release of a wireless traffic channel before update process completion.

FIG. 5 illustrates an operation 500 of wireless communication system 300 to prevent release of a wireless traffic channel before update process completion. In this example, like with operation 400, call module 331 directs wireless device 301 to establish a voice call with another device over a wireless traffic channel with base station 302. The call may be initiated by wireless device 301 as an outgoing call or by the other device as an incoming call. While this example describes a voice call using the traffic channel, the traffic channel could be in use for other services, such as data exchanges for applications executing on wireless device 301.

Once the wireless traffic channel is established, authorization system 304 notifies wireless device 301 that an update is needed to authentication information that wireless device 301 uses to access wireless network 302. Wireless device 301 may have used previous authorization information (i.e. information from before the update) to request the current wireless traffic channel. Upon receiving the notification, wireless device 301 sets a flag therein, which indicates that a wireless traffic channel should not be released. The flag may be a bit in a memory of wireless device 301 that is considered to be set when having the value of 1 or 0 depending on the convention used. Alternatively, other types of flags may also be used that may require more memory and may include additional information, such as a reason for the flag being set. The notification may be a dedicated message from authorization system 304, which may also indicate that background update process 322 should start, or may be a communication exchanged as an initial communication in background update process.

At some point during the execution of background update process 332, the voice call is ended. The voice call may be ended by wireless device 301 or the other device receiving a user instruction to end the call, by a system on the call path between the two devices ending the call, or for some other reason a call may be ended. Once the call is ended, the wireless traffic channel used to carry the call would be released if background update process 332 was not occurring. However, since the flag is set in wireless device 301, wireless device 301 is prevented from releasing the wireless traffic channel until update process 332 completes.

Upon completion of update process 332, authorization system 304 transfers a completion notification message to wireless device 301, which indicates that the flag can be cleared. Once the flag is cleared, wireless device 301 is allowed to release the wireless traffic channel if no other operation of wireless device 301, such as another phone call, is using the wireless traffic channel. In some embodiments, rather than having to receive the completion notification message from authorization system 304, wireless device 301 itself recognizes that update process 332 has completed and removes the flag at that time. In other embodiments, the flag is cleared after a predetermined period of time elapses since the flag was set. Moreover, such a time period may also be used in combination with other completion determination means to ensure the wireless traffic channel can be released if update process 332 is prevented from completing for some reason (e.g. an error occurs during update process 332 that prevents it from completing).

Figure 6:
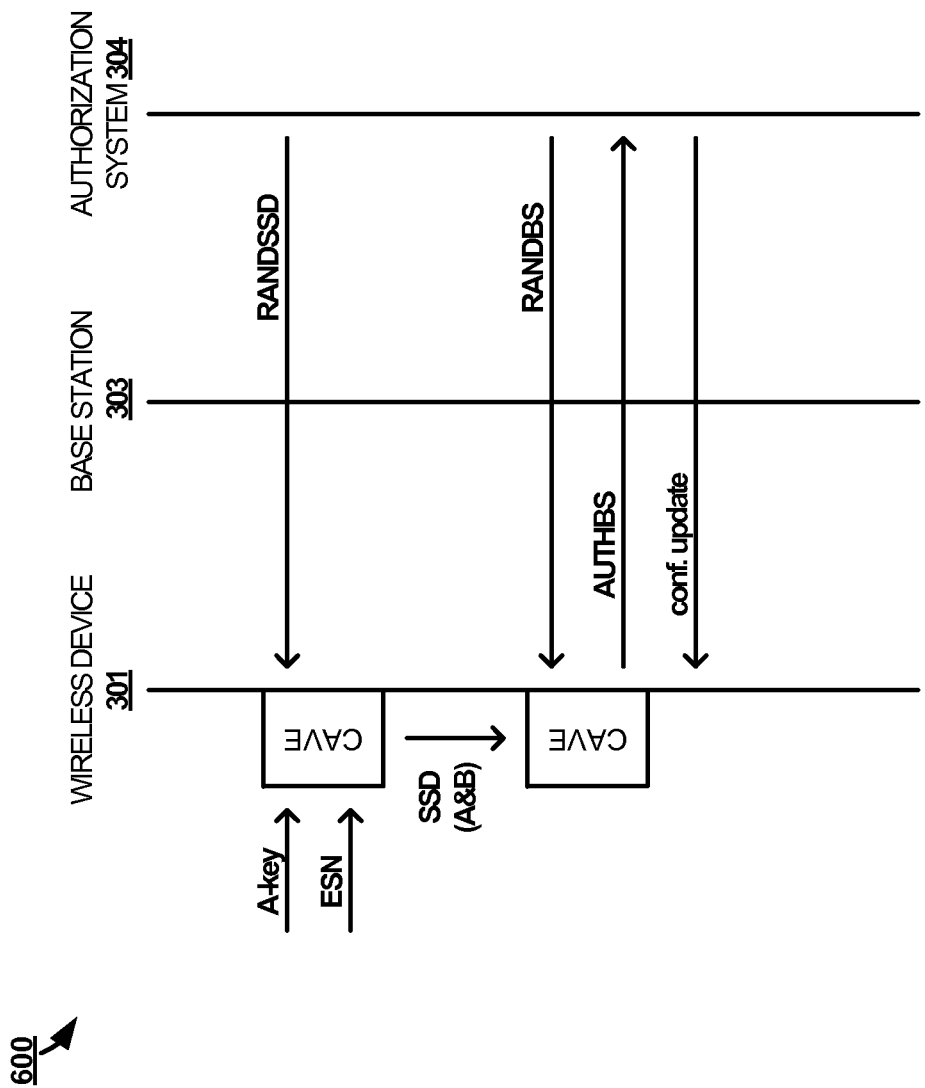
FIG. 6 illustrates an update process during which release of a wireless traffic channel is prevented.

FIG. 6 illustrates an update process 600 during which release of a wireless traffic channel is prevented. Update process 600 may be an example of background update process 332, although, update process 332 may perform other operations. Update process 600 is a process to update shared secret data (SSD) credentials that wireless device 301 uses when authenticating itself with wireless network 302.

During update process 600, wireless device 301 receives a random number (RANDSSD) generated by authorization system 304 by and transferred from authorization system 304. Wireless device 301 uses RANDSSD, an A-key already stored in wireless device 301, and the electronic serial number (ESN) of wireless device 301 as inputs to the Cellular Authentication and Voice Encryption (CAVE) algorithm. The outputs of CAVE are two keys, SSD_A and SSD_B. Wireless device 301 receives another random number (RANDBS) generated by and transferred from authorization system 304. SSD_A, SSD_B, and RANDBS are then used as inputs into CAVE by wireless device 301. An output, AUTHBS, is transferred to authorization system 304. If AUTHBS matches the AUTHBS value calculated by authorization system 304, then the update of the SSD for wireless device 301 is confirmed and authorization system 304 transfers a notification of such to wireless device 301. This notification message may also serve as a message to clear the flag in operation 500.

In some wireless networks, such as CDMA networks, the above SSD update process must complete within a given number of attempts (e.g. 3). If the process does not complete within three attempts, wireless device 301 may not be allowed access to wireless network 302 until further action on behalf of a user is performed. For example, without the traffic channel release prevention described herein, such a situation might arise if wireless device 301 participates in three sequential calls that are ended quickly, which causes the release of the wireless traffic channel before update process 600 can complete. In contrast, using the traffic channel release prevention described herein, when one of those calls is ended before update process 600 completes, the wireless traffic channel is prevented from being released until update process 600 completes.

Figure 7:
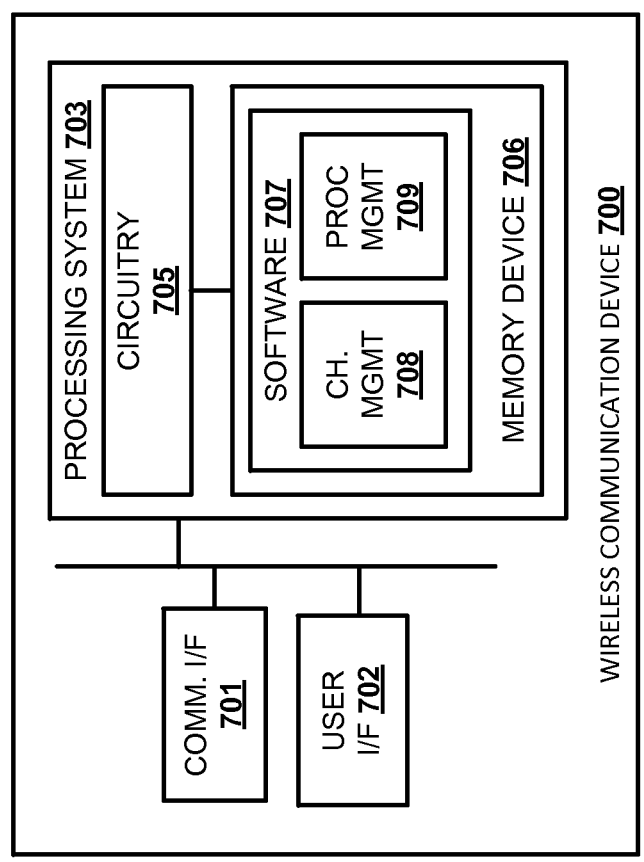
FIG. 7 illustrates a wireless communication device for preventing release of a wireless traffic channel before update process completion.

FIG. 7 illustrates wireless communication device 700. Wireless communication device 700 is an example of wireless communication device 101, although device 101 could use alternative configurations. Wireless communication device 700 comprises wireless communication interface 701, user interface 702, and processing system 703. Processing system 703 is linked to wireless communication interface 701 and user interface 702. Processing system 703 includes processing circuitry 705 and memory device 706 that stores operating software 707. Wireless communication device 700 may include other well-known components such as a battery and enclosure that are not shown for clarity. Wireless communication device 700 may be a telephone, computer, e-book, mobile Internet appliance, media player, game console, wireless network interface card, or some other wireless communication apparatus—including combinations thereof.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, EVDO, WIMAX, GSM, LTE, WIFI, HSPA, or some other wireless communication format.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes traffic channel management module 708 and process management module 709. Operating software 707 may further include an operating system, utilities, drivers, network interfaces, applications, or some other type of software. When executed by processing circuitry 705, operating software 707 directs processing system 703 to operate wireless communication device 700 as described herein.

In particular, traffic channel management module 708 directs processing system 703 to establish a wireless traffic channel between the wireless communication device via communication interface 701 and a wireless access point of a wireless communication network. Process management module 709 directs processing system 703 to identify an event that triggers release of the wireless traffic channel by the wireless communication device and, upon identifying the event, prevent the release of the wireless traffic channel until a background update process that uses the wireless traffic channel is completed. Process management module 709 further directs processing system 703 to, upon completion of the background update process, allow the release of the wireless traffic channel.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, comprising:
   establishing a voice call using a wireless voice traffic channel between the wireless communication device and a wireless access point of a wireless communication network;
   upon establishing the voice call using the wireless voice traffic channel, receiving an indication of the occurrence of the background update process;
   in response to the indication of the occurrence, setting a flag in the wireless communication device to prevent the release of the wireless voice traffic channel;
   initiating a background update process on the wireless communication device that uses the wireless voice traffic channel before completion of the voice call;
   determining that the voice call is completed and preventing the release of the wireless voice traffic channel until the background update process that uses the wireless voice traffic channel is completed; and
   upon completion of the background update process, allowing the release of the wireless voice traffic channel.

2. The method of claim 1, wherein the background update process comprises an operation to update authentication information that is used by the wireless communication device when requesting access to the wireless communication network.

3. The method of claim 2, wherein the authentication information comprises shared secret data (SSD) and the operation to update access information comprises an operation to update the SSD using Cellular Authentication and Voice Encryption (CAVE).

4. The method of claim 1, further comprising:
   identifying the completion of the background update process based on a predetermined amount of time elapsing since establishment of the wireless voice traffic channel.

5. The method of claim 1, further comprising:
   identifying the completion of the background update process based on a notification that the background update process has completed.

6. The method of claim 1, further comprising:
   identifying the completion of the background update process based on removal of the flag.

7. The method of claim 6, further comprising:
   receiving an indication of the completion of the background update process; and
   in response to the indication of the completion, removing the flag.

8. The method of claim 1, further comprising:
upon completion of the voice call, indicating to a user that the wireless voice traffic channel has been released.

9. A wireless communication device, comprising:
a communication interface configured to establish a voice call using a wireless voice traffic channel between the wireless communication device and a wireless access point of a wireless communication network, upon establishing the voice call using the wireless voice traffic channel, receive an indication of the occurrence of the background update process; and
a processing system configured to in response to the indication of the occurrence, set a flag in the wireless communication device to prevent the release of the wireless voice traffic channel, initiate a background process on the wireless communication device that uses the wireless voice traffic channel before completion of the voice call, determine that the voice call is complete, prevent the release of the wireless voice traffic channel until the background update process that uses the wireless voice traffic channel is completed, and, upon completion of the background update process, allow the release of the wireless voice traffic channel.

10. The wireless communication device of claim 9, wherein the background update process comprises an operation to update authentication information that is used by the wireless communication device when requesting access to the wireless communication network.

11. The wireless communication device of claim 10, wherein the authentication information comprises shared secret data (SSD) and the operation to update access information comprises an operation to update the SSD using Cellular Authentication and Voice Encryption (CAVE).

12. The wireless communication device of claim 9, further comprising:
the processing system configured to identify the completion of the background update process based on a predetermined amount of time elapsing since establishment of the wireless voice traffic channel.

13. The wireless communication device of claim 9, further comprising:
the processing system configured to identify the completion of the background update process based on a notification that the background update process has completed.

14. The wireless communication device of claim 9, further comprising:
the processing system configured to identify the completion of the background update process based on removal of the flag.

15. The wireless communication device of claim 14, further comprising:
the communication interface configured to receive an indication of the completion of the background update process; and
the processing system configured to, in response to the indication of the completion, remove the flag.

16. The wireless communication device of claim 9, further comprising:
the processing system configured to, upon completion of the voice call, indicate to a user that the wireless voice traffic channel has been released.

* * * * *